F7549 OR RE 14,496

C. H. MALSTROM & W. K. ANDERSEN.

CARBURETER.

APPLICATION FILED APR. 16, 1917.

Reissued July 23, 1918. 14,496.

Witness

Chas. L. Grisshuber

Inventors

C. H. Malstrom

W. K. Andersen, by

Charles W. Hills

Attorney

THE NORRIS PETERS CO., PHOTO-LITHO., WASHINGTON, D. C.

UNITED STATES PATENT OFFICE.

CARL HJALMAR MALSTROM, OF BROOKLYN, NEW YORK, AND WILLIAM K. ANDERSEN, OF BETHLEHEM, PENNSYLVANIA, ASSIGNORS TO FREDERICK PURDY, OF CHICAGO, ILLINOIS.

CARBURETER.

14,496. Specification of Reissued Letters Patent. Reissued July 23, 1918.

Original No. 1,180,518, dated April 25, 1916, Serial No. 757,424, filed March 28, 1913. Application for reissue filed April 16, 1917. Serial No. 162,552.

*To all whom it may concern:*

Be it known that we, CARL HJALMAR MALSTROM, a subject of the King of Sweden, and WILLIAM K. ANDERSEN, a subject of the King of Denmark, and residents, respectively, of the borough of Brooklyn, city and State of New York, and Bethlehem, county of Northampton, State of Pennsylvania, formerly of the borough of Brooklyn, in the city and State of New York, have invented a new and useful Improvement in Carbureters, of which the following is a specification.

The object of our invention is to provide means whereby an additional charge of fuel is automatically deposited upon the auxiliary air intake valve upon starting the engine.

A further object is to provide an auxiliary air inlet valve which by its movement will control the amount of fuel to be deposited thereon.

A practical embodiment of our invention is represented in the accompanying drawings, in which—

Figure 1:
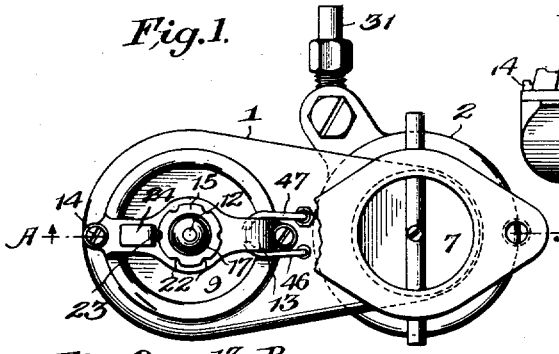
Figure 6:
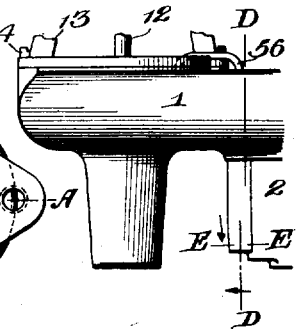
Figure 4:
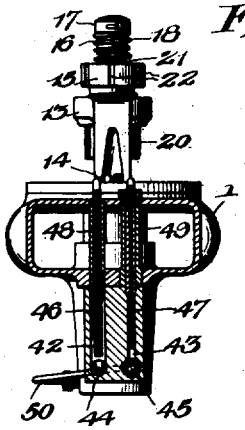
Figure 2:
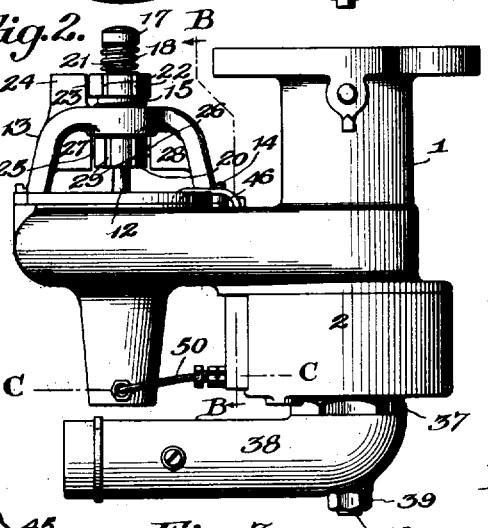
Figure 7:
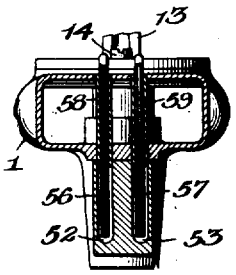
Figure 5:
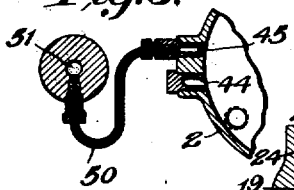
Figure 3:
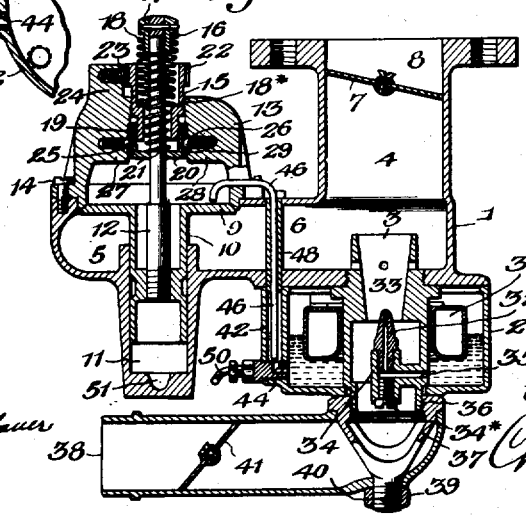
Figure 8:
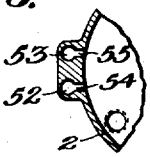

Figure 1 represents the carbureter in top plan. Fig. 2 represents a side elevation. Fig. 3 represents a longitudinal vertical central section taken in the plane of the line A—A of Fig. 1. Fig. 4 represents a vertical section taken in the plane of the line B—B of Fig. 2. Fig. 5 represents a detail horizontal section taken in the plane of the line C—C of Fig. 2. Fig. 6 represents a detail side elevation of a modified form of carbureter. Fig. 7 represents a detail vertical section taken in the plane of the line D—D of Fig. 6, and Fig. 8 represents a horizontal section taken in the plane of the line E—E of Fig. 6.

The carbureter comprises an upper casing member 1 containing the mixing chamber and auxiliary air inlet, a lower casing member 2 containing the liquid hydrocarbon chamber, and the Venturi tube 3 which is detachably secured to the upper member 1 and to the lower member 2 and serves to hold the upper and lower members in their assembled position. The upper member 1 is provided with a mixing chamber 4 and an auxiliary air inlet chamber 5 which communicates with the mixing chamber 4 through a passage 6. A throttle valve 7 is provided for the outlet 8 from the mixing chamber 4.

A valve 9 having a piston or plunger 10 depending therefrom is fitted to slide in the chamber 11 of a cylinder formed integral with the upper casing member 1. The valve 9 is further provided with a stem 12 uprising therefrom which is in engagement with a yoke 13 secured to the upper casing member 1 by screws 14.

For the purpose of adjusting the pressure of the valve 9 upon its seat we provide an adjustable bearing 15 having a screw threaded engagement with the yoke 13 between which bearing and a shoulder 16 on a collar 17 fixed to the top of the stem 12 there is interposed a spring 18. The bearing 15 is recessed as shown at 18* for the reception of the spring. The end of the bearing extending below the yoke 13 is reduced and provided with a screw-thread 19 fitted to receive an adjusting nut 20, which nut supports one end of a spring 21 and serves to compress the said spring against the bottom of the collar 17.

To secure the adjustable bearing against any unintentional rotation we provide the bearing with a series of vertical grooves 22 near the top, which are adapted to receive a spring pressed ball 23 secured in a lug 24 uprising from the yoke 13.

To secure the adjusting nut 20 against rotation, a pair of spring pressed balls 25, 26, arranged diametrically opposite in lugs 27, 28 on the under side of the yoke 13, are adapted to engage a series of vertical grooves 29 cut in the nut 20. It will thus be seen that by the rotation of the bearing 15 the spring 18 may be tightened or loosened, and by rotation of the adjustable nut 20 the spring 21 may be tightened or loosened thereby adding or relieving the tension on the valve 9.

The lower member 2 contains the liquid hydrocarbon chamber within which is located a concentric float 30 surrounding the body portion of the Venturi tube 3. The float 30 controls the supply of liquid hydrocarbon from the supply pipe 31 in the usual manner.

The axially arranged liquid hydro-carbon supply nozzle 32 extends upwardly into the carbureting chamber 33 and is removably secured in the upper end of a hollow centrally arranged lug 34 within the Venturi tube 3, the lower end of which lug is closed by a suitable screw 34*. A transverse duct 35 leads inwardly from the liquid hydrocarbon chamber into communication with the nozzle 32. The bottom of the Venturi tube is provided with a screw-threaded portion 36 for receiving the caged nut 37 which nut is adapted to receive a main air inlet pipe 38 and secured by a nut 39 on the stem 40. The main air inlet pipe 38 is provided with a suitable valve 41.

For the purpose of depositing an additional charge of liquid hydro-carbon upon the auxiliary air inlet valve 9 there are formed in the wall of the liquid hydrocarbon chamber two passages 42, 43, which are connected by ducts 44, 45, to the liquid hydrocarbon chamber. Small tubes 46, 47 lead from the passages 42, 43 up through sleeves 48, 49 fixed in the upper casing member, and terminating a short distance above the auxiliary air inlet valve 9.

From the passage 43 leads a pipe 50 which connects with a well 51 in the bottom of the piston chamber 11 in the upper casing member.

In operation the throttle valves 7 and 41 being opened causes the suction due to the inward movement of the work piston of the engine, not shown, to open the auxiliary air inlet valve 9, which will force its piston or plunger 10 down in its chamber 11 and exert sufficient pressure to cause the liquid hydro-carbon to be forced up, through the tube 47 and on top of the valve 9, whereupon the liquid will be drawn with the auxiliary air into the upper casing member and mixing chamber 4, where it will mix with the regular charge from the Venturi tube and pass out through the outlet 8 to the piston, thereby causing a very rich mixture to be fed to the engine at the time of starting. This forcing of the liquid hydrocarbon up through the tube 47 is accomplished because the duct 45 is so small that the liquid hydrocarbon will escape more readily through the larger opening through the tube 47 than through the duct 45; this duct being merely for the purpose of supplying the liquid hydrocarbon to the passage 43. An additional supply of liquid hydrocarbon is drawn from the passage 42 through the tube 46 and deposited onto the top of the valve 9, due to the suction caused by the opening of the said valve.

From the construction it will be obvious that this same operation will take place while the engine is running and upon a sudden further opening of the throttles 7 and 41 to increase the speed. That is to say, with the engine in operation and running at such low speed that the suction does not retain the valve 9 open, or when it is running at such a speed as to retain said valve partly open but substantially stationary, a sudden further opening of said throttle valves will cause a corresponding sudden opening of valve 9, whereby the pumping action will result, and the additional inrush of air through the valve 9 will be met by a jet of hydrocarbon liquid forced through the pipe 47 by the operation of the pump, thereby properly enriching the supplemental air drawn in through the valve 9, said pumping action supplying liquid hydrocarbon in excess of that withdrawn by aspiration.

The tube 47 is made to snugly fit the passage 43 so that the liquid hydrocarbon will be forced up through the tube at the initial movement of the plunger. The bore of the tube 47 is reduced at its lower end, which being held in the liquid hydro-carbon at all times keeps the tube full and ready to be squirted in a fine stream upon the top of the valve 9. The duct 45 is made smaller than the duct 44, to prevent an excess supply of liquid hydro-carbon being sucked in by the plunger in its movement, and to permit the plunger to add greater force to the stream to be squirted up through the tube 47.

In the form shown in Figs. 6, 7 and 8 the passages 52 and 53 are similar in form and size, and are connected to the liquid hydrocarbon chamber by ducts 54, 55. Small tubes 56, 57 lead from the passages 52, 53 up through the sleeves 58, 59 fixed in the upper casing member terminating with the ends turned down and a short distance above the auxiliary air inlet valve 9. In this form the suction from the work piston of the engine, not shown, alone draws or sucks the charge of liquid hydro-carbon from both the tubes 56, 57, and to the top of the auxiliary air inlet valve. It will be seen that the piston acts as a guide for the auxiliary valve 9 and not as a pump.

In both forms the piston and piston chamber act as a dash pot serving to control the initial movement of the valve, also preventing the valve from chattering when running at high speed, and absorbing the jar or sudden action given the springs upon starting.

It is obvious that slight changes might be resorted to in the form and arrangement of the several parts without departing from the spirit and scope of our invention; hence we do not wish to limit ourselves strictly to the structure herein set forth but,

What we claim is:—

1. A carbureter comprising a liquid hydro-carbon chamber, a mixing chamber, a main air inlet, an auxiliary air inlet, its valve, and means controlled by said valve for discharging a supply of liquid hydrocarbon upon the said valve, and an independent means for depositing an additional supply of liquid hydro-carbon upon the said valve.

2. A carbureter comprising a liquid hydro-carbon chamber, a mixing chamber, a main air inlet, an auxiliary air inlet, its valve, and means controlled by said valve for forcing a supply of liquid hydro-carbon upon the said valve.

3. A carbureter comprising a liquid hydro-carbon chamber, a mixing chamber, a main air inlet, an auxiliary air inlet, its valve, and means controlled by said valve for forcing a supply of liquid hydro-carbon upon the said valve, and an independent means for depositing an additional supply of liquid hydro-carbon upon the said valve.

4. A carbureter comprising a mixing chamber, an auxiliary air inlet, its valve, a main air inlet, a liquid hydro-carbon chamber, a passage in the wall of the carbureter communicating with the liquid hydro-carbon chamber, and means controlled by said auxiliary air inlet valve for forcing a supply of liquid hydro-carbon from said passage to the top of the auxiliary valve.

5. A carbureter comprising an upper member having therein a mixing chamber, an auxiliary air inlet and its valve, a lower member having therein a main air inlet and a liquid hydro-carbon chamber, a passage in the wall of the lower member communicating with the liquid hydro-carbon chamber, and means controlled by said auxiliary inlet valve for forcing a supply of liquid hydro-carbon from said passage to the top of the auxiliary valve.

6. A carbureter comprising a mixing chamber, an auxiliary air inlet, its valve, a main air inlet, a liquid hydro-carbon chamber, passages in the wall of the carbureter communicating with the liquid hydro-carbon chamber, means controlled by said auxiliary inlet valve for forcing a supply of liquid hydro-carbon from one passage to the top of said valve and an independent means for depositing a supply of liquid hydro-carbon from another passage to the top of said valve.

7. A carbureter comprising an upper member having therein a mixing chamber, an auxiliary air inlet and its valve, a lower member having therein a main air inlet and a liquid hydro-carbon chamber, passages in the wall of the lower member communicating with the liquid hydro-carbon chamber, means controlled by said auxiliary inlet valve for forcing a supply of liquid hydro-carbon from one passage to the top of said valve, and an independent means for depositing a supply of liquid hydro-carbon from another passage to the top of said valve.

8. A carbureter comprising a mixing chamber, an auxiliary air inlet, its valve, a main air inlet, a liquid hydro-carbon chamber, a pair of passages in the wall of the carbureter having connections leading to the top of said auxiliary inlet valve and communicating with the liquid hydro-carbon chamber, means controlled by said auxiliary inlet valve for forcing a supply of liquid hydro-carbon from one passage to the top of said valve and an independent means for depositing a supply of liquid hydro-carbon to the top of said valve from the other passage.

9. A carbureter comprising an upper member having therein a mixing chamber, an auxiliary air inlet and its valve, a lower member having therein a main air inlet and a liquid hydro-carbon chamber, a pair of passages in the wall of the lower member having connections leading to the top of said valve and communicating with the liquid hydro-carbon chamber, means controlled by said auxiliary inlet valve for forcing a supply of liquid hydro-carbon from one passage to the top of said valve, and an independent means for depositing a supply of liquid hydro-carbon to the top of said valve from the other passage.

10. A carbureter comprising a mixing chamber, a piston chamber, an auxiliary air inlet, its valve having a plunger depending therefrom and fitted to slide in said piston chamber, a main air inlet, a liquid hydro-carbon chamber, a passage in the wall of the liquid hydro-carbon chamber and communicating therewith, said passage having a connection leading therefrom to the top of the auxiliary valve and means controlled by said valve for forcing a supply of liquid hydro-carbon through the passage and its connection to the top of the valve.

11. A carbureter comprising an upper member having therein a mixing chamber, a piston chamber, an auxiliary air inlet, its valve having a plunger depending therefrom and fitted to slide in said piston chamber, a lower member having therein a main air inlet, and a liquid hydro-carbon chamber, a passage in the wall of the liquid hydro-carbon chamber, said passage having a connection leading therefrom to the top of the auxiliary valve, and means controlled by said valve for forcing a supply of liquid hydro-carbon through the passage and its connection to the top of the valve.

12. A carbureter comprising a mixing chamber, a piston chamber, an auxiliary air inlet, its valve having a plunger depending therefrom and fitted to slide in said piston chamber, a main air inlet, a liquid hydro-carbon chamber, a pair of passages in the wall of the liquid hydro-carbon chamber and communicating therewith, said passages having connections leading therefrom to the top of the auxiliary valve, means controlled by said valve for forcing a supply of liquid hydro-carbon through one passage and its connection to the top of the auxiliary valve and an independent means for depositing a supply of liquid hydro-carbon through the other passage and its connection to the top of the valve.

13. A carbureter comprising an upper member having therein a mixing chamber, a piston chamber, an auxiliary air inlet, its valve having a plunger depending therefrom and fitted to slide in said piston chamber, a lower member having therein a main air inlet, a liquid hydro-carbon chamber, a pair of passages in the wall of the liquid hydro-carbon chamber and communicating therewith, said passages having connections leading therefrom to the top of the auxiliary valve, and means controlled by said valve for forcing a supply of liquid hydro-carbon through one passage to the top of the valve and means independent of the valve for depositing a supply of liquid hydro-carbon upon the top of the valve from the other passage.

14. In a carbureter, a plurality of air inlets, a fuel inlet for each air inlet adapted to operate by aspiration, a valve normally closing one of said air inlets and adapted to open under increased suction, and a pump operated by increased suction and connected with one of said fuel inlets, whereby the operation of said pump forces fuel through such fuel inlet in excess of that withdrawn by aspiration.

15. In a carbureter, a plurality of air inlets, a fuel inlet for each air inlet adapted to operate by aspiration, a valve normally closing one of said air inlets and adapted to open under increased suction, and a pump operated by increased suction and connected with the fuel inlet of said valved air inlet, whereby the operation of said pump forces fuel through such fuel inlet of said valved air inlet in excess of that withdrawn by aspiration.

16. In a carbureter, means operated by the suction within the carbureter for introducing a supply of fuel into the carbureting chamber by aspiration, a pump for pumping fuel in excess of the fuel supplied by aspiration, and a normally closed air valve adapted to be opened by a reduction in pressure in the carbureting chamber and connected with said pump to operate the same.

CARL HJALMAR MALSTROM.
WILLIAM K. ANDERSEN.

Copies of this patent may be obtained for five cents each, by addressing the "Commissioner of Patents, Washington, D. C."